United States Patent
Dugar et al.

(10) Patent No.: US 7,586,708 B1
(45) Date of Patent: Sep. 8, 2009

(54) TAPE DRIVE FOR AVOIDING TAPE STICTION

(75) Inventors: Vincent F. Dugar, Golden, CO (US); Robert O. Wyman, Longmont, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 12/061,744

(22) Filed: Apr. 3, 2008

(51) Int. Cl.
G11B 15/48 (2006.01)
G11B 15/18 (2006.01)

(52) U.S. Cl. .................... 360/74.2; 360/74.3; 360/72.3; 242/333; 242/334.4

(58) Field of Classification Search ........................ None
See application file for complete search history.

(56) References Cited

U.S. PATENT DOCUMENTS

| | | | |
|---|---|---|---|
| 5,367,471 A * | 11/1994 | Nguyen et al. ............. 360/74.3 |
| 6,243,225 B1 | 6/2001 | Wyman et al. |
| 6,490,114 B1 | 12/2002 | Gill et al. |
| 6,493,167 B2 * | 12/2002 | Kobayashi et al. ......... 360/72.3 |
| 7,163,170 B1 | 1/2007 | Wyman et al. |
| 2003/0029950 A1 | 2/2003 | Panda et al. |
| 2009/0059428 A1 * | 3/2009 | Kientz et al. ................ 360/134 |

* cited by examiner

*Primary Examiner*—Andrew L Sniezek
(74) *Attorney, Agent, or Firm*—Brooks Kushman P.C.

(57) ABSTRACT

A method for avoiding tape stiction is provided with a tape drive with a pair of motors for driving a pair of tape reels for conveying data tape across one or more read/write heads. Tachometers measure rotation of the pair of tape reels. Motion of the tape is started and rotation of the tape reels is measured by the tachometers. The measurement of the rotation of the tape reels is compared to determine if there is enough slack associated with tape stiction. The location of tape stiction is stored and weighted. Another method stops motion of the tape at a location wherein excessive tape stiction has not been detected. A tape drive is provided for performing methods for avoiding tape stiction.

20 Claims, 2 Drawing Sheets

TAPE DRIVE FOR AVOIDING TAPE STICTION

BACKGROUND

1. Technical Field

Embodiments of the invention relate to tape drives for avoiding tape stiction with data storage tape.

2. Background Art

Data storage devices such as data storage tape cartridges have been employed in the computer, audio, video and related arts. Data storage devices are often employed for recording and storing large quantities of data for subsequent access and use.

Continual advancement of tape drive systems results in an increase of areal density of the tape drive systems in order to support higher capacity data cartridges. Increased areal data densities are provided by increasing the number of tracks per inch and/or by increasing the linear bit density. As the linear bit density recorded to the tape continues to increase, the location of the tape relative to a read/write head must be decreased in order to support the higher linear densities of the tape. For example, at linear densities of several hundred thousand bits per inch, the required head to tape spacing is on the order of tens of nanometers. To maintain the spacing, the tape and head surfaces must become smoother and more uniform than those used in lower capacity cartridges. Smooth tape has better recording properties that allows for higher recorded linear densities, but is more prone to stiction. Tape stiction is the initial force required to overcome a static friction bond between stationary tape and a read/write head. Thus, tape stiction events are typically localized to start motions after the tape is stopped.

In the process of attempting to repeatedly move magnetic tape media across a recording head surface, the media surface, and to some extent the head surface, become further smoothened. As a result of this condition, when the tape is stopped in contact with the recording head, the occurrence of tape stiction may be increased.

Although tape stiction often inhibits movement of the tape across the read/write head surface, tape stiction can also cause perturbations in the motion of tape in a tape guidance path. Such disruption of tape movement can lead to damage to the tape media surface and/or tape media edges.

In addition to risking damage to the recording media and the recorded data, tape stiction can also result in permanent errors during data handling and a drop in performance or throughput of the recording data storage system.

The prior art has offered a method for detection of tape stiction. Tape is often driven from one tape reel to another tape reel by a pair of motors that are each connected to one of the tape reels. A tachometer is connected to each tape reel to monitor the rotation of the associated tape reel. The tachometers convey the rotational data to a controller which converts the rotation of each tape reel to an associated linear displacement. The linear displacement is compared for each tape reel and if the linear displacement differs by a predetermined amount at the start up of one of the motors, then tape stiction is detected.

SUMMARY

One embodiment provides a method for avoiding tape stiction with a tape drive by providing the tape drive with a pair of motors for driving a pair of tape reels for conveying data tape between the pair of tape reels across at least one read/write head. A tachometer is provided for each of the pair of tape reels for measuring rotation. Motion of the tape is started by driving the pair of motors. Rotation for both tape reels is measured by the tachometers. The measurement of rotation of both tape reels is compared to determine if linear displacement of both tape reels differs enough to cause slack that is associated with the tape adhering to the read/write head. A location of tape stiction is stored and weighted.

Another embodiment provides a tape drive system having at least one read/write head, a pair of motors for driving a pair of tape reels for conveying data tape between the pair of tape reels across the read/write head, a pair of tachometers each connected to one of the pair of tape reels for measuring rotation of the tape reel, and a controller in communication with the pair of motors and the pair of tachometers. The controller has computer executable instructions for starting motion of the tape by driving the pair of motors, measuring rotation of both tape reels by the tachometers, comparing linear displacement by both tape reels to determine if the measurement of rotation of both tape reels differs enough to cause slack that is associated with the tape adhering to the read/write head, storing and weighting a location of tape stiction.

DETAILED DESCRIPTION OF EMBODIMENTS

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or a representative basis for teaching one skilled in the art to variously employ the present invention.

Figure 1:
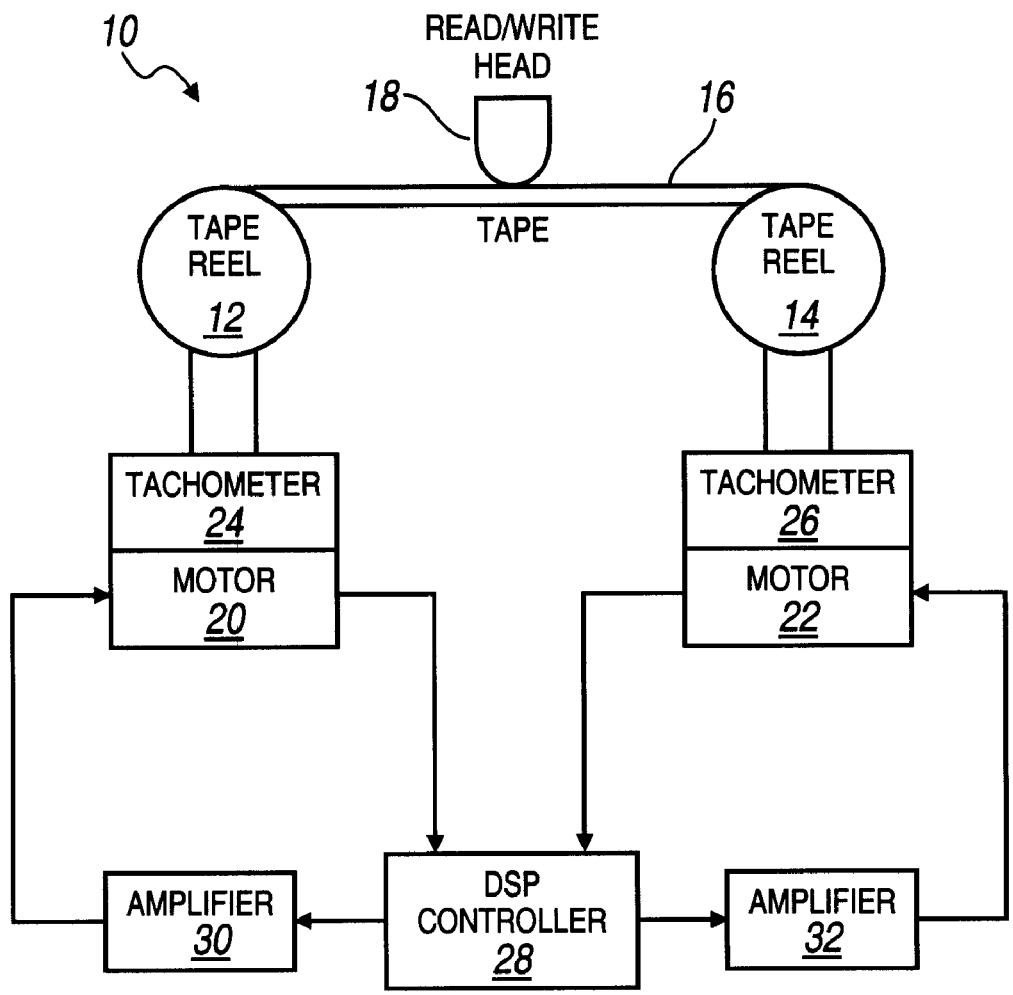
FIG. 1 is a schematic diagram of components of a tape drive system according to an embodiment of the invention.
Figure 2:
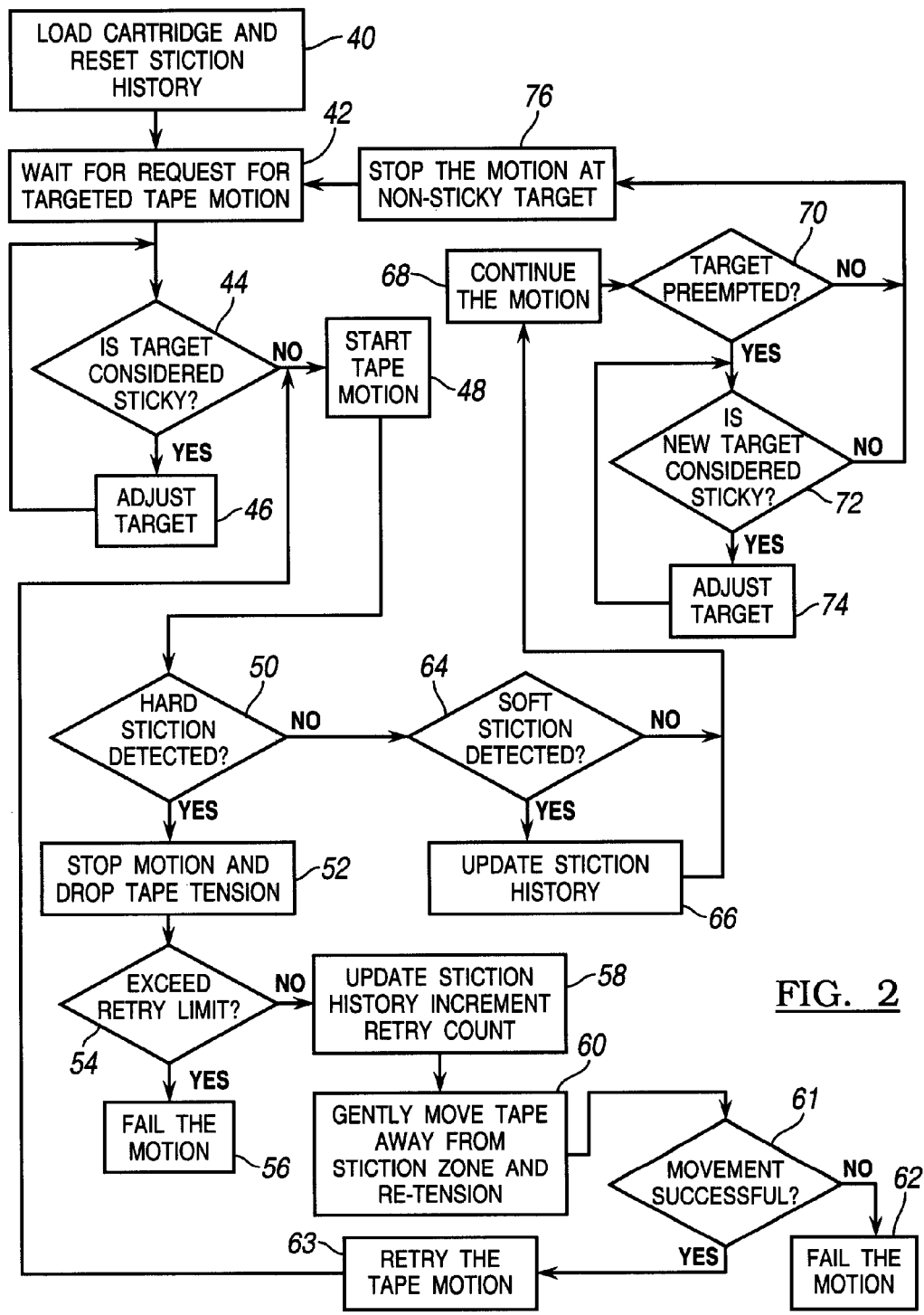
FIG. 2 is a flowchart for a method for avoiding tape stiction for a tape drive system according to another embodiment of the invention.

The embodiments set forth in FIGS. 1 and 2 are generally illustrative and describe a controller or module, or other such electrically based component. All references to the controller and electrically based components and the functionality provided for each, are not intended to be limited to encompassing only what is illustrated and described herein. While particular labels may be assigned to the controller and/or electrical components disclosed, such labels are not intended to limit the scope of operation for the controllers and/or the electrical components. The controllers may be combined with each other and/or separated in any manner based on the particular type of electrical architecture that is desired or intended to be implemented in the tape drive system.

With reference now to FIG. 1, a tape drive system is illustrated according to an embodiment of the invention and is referenced generally by numeral 10. The tape drive system 10 is depicted by a reel-to-reel tape drive system. The tape drive system 10 includes a pair of tape reels 12, 14 for conveying magnetic tape 16 across a read/write head 18. Although one read/write head 18 is depicted, embodiments of the invention contemplate that the tape drive system 10 may employ any number of read/write heads 18. The tape 16 is connected from tape reel 12 to tape reel 14. The tape reels 12 and 14 may be embodied within a dual reel tape cartridge. Alternatively, the tape 16 may be provided within a single reel tape cartridge wherein a free end or leader of the tape 16 is connected to a tape reel, such as tape reel 14, of the tape drive system 10. As the tape 16 is conveyed across the read/write head(s) 18, data is stored upon or retrieved from, the tape 16.

The tape drive system 10 includes a pair of motors 20, 22, each connected to one of the tape reels 12, 14 for driving the tape reels 12, 14 and thereby conveying the tape 16 from one tape reel to another. A pair of tachometers 24, 26 are connected to each tape reel 12, 14 for measuring rotation of the associated tape reel 12, 14. A digital signal processor (DSP) controller 28 is provided which communicates with the motors 20, 22 through a pair of amplifiers 30, 32 for controlling the drive of the motors 20, 22 and consequently the rotation of the tape reels 12, 14. The tachometers 24, 26 are in communication with the controller 28 for conveying a measurement of rotation from the tape reels 12, 14 to the controller 28.

As discussed above, the tachometers 24, 26 monitor the rotation of the tape reels 12, 14 and convey that information to the controller 28. The controller 28 converts the rotation of the tape reels 12, 14 to a measurement of linear displacement of the tape 16. The controller 28 compares the linear displacement provided by the tape reels 12, 14; and if there is a difference in the comparison such that linear displacement of the reel feeding tape exceeds that of the reel accepting tape, the difference is associated with slack in the tape 16. The slack in the tape 16 can be caused by the tape 16 adhering to the read/write head 18. If enough slack in the tape 16 is measured, tape stiction is detected.

In many tape drives, once a tape cartridge is loaded, the tape 16 is maintained in contact with the read/write head 18. Each time the tape 16 is started from a stop, probability of stiction of the location on the tape is increased. If that location were avoided, the probability of stiction of that location reduces over time. When starting motion from a new location on tape, multiple start/stop cycles must reoccur on that location before detectable stiction occurs again, which would then require additional avoidance.

FIG. 2 illustrates a method for avoiding tape stiction according to an embodiment of the tape drive 10. By avoiding the detected locations of tape stiction, the potential for stiction related issues is reduced and the effects of tape stiction can be mitigated. Thus, tape drive operation can continue for longer periods of time without errors or tape damage.

At block 40, a tape cartridge is loaded into the tape drive 10. The cartridge may be loaded by automation or may be loaded manually. The resulting blocks of the method of FIG. 2, are performed by the controller 28 for at least one embodiment of the invention. Once the cartridge is loaded at block 40, the tape drive 10 begins learning locations of tape stiction for the cartridge during operation. Alternatively, the locations of tape stiction may be stored within a memory on the controller 28 and the locations may be retrieved upon identification of the cartridge, such as by a radio frequency identification tag (RFID tag). Alternatively, the locations of stiction may be recorded upon the tape 16 of the cartridge and once the cartridge is loaded at block 40, the tape stiction history may be retrieved.

As discussed above, locations of tape stiction are reduced over time as the tape 16 is not stopped with the location of tape stiction upon the read/write head 18. Thus, for the embodiment depicted, the tape drive 10 learns the positions of tape stiction after the cartridge is loaded at block 40. The locations are stored within the controller 28 temporarily and are utilized for avoidance during the operation of the single cartridge. The information is only stored temporarily because locations of tape stiction decrease once avoided and therefore long term storage of this information is not required. Thus, when a new cartridge is loaded, the stiction history is reset at block 40.

At block 42, the tape drive 10 waits for a request for targeted tape motion. The target is the location at which the tape 16 is to be stopped at the end of the requested tape motion. At decision block 44, the tape drive 10 determines whether that target has previously stored tape stiction history. If there is no recorded tape stiction history for the cartridge, such as a recently loaded cartridge, block 44 may be skipped. At block 44, the target for the tape motion is compared to stored tape stiction history, which may be stored within the controller 28 within servo memory, such as servo memory for the servo motors 20, 22. If the location has sufficiently-weighted tape stiction history, the location is deemed 'sticky' and the target is adjusted at block 46. The target may be offset incrementally at block 46, which slightly changes the time required to do the tape motion. After the target is adjusted at block 46, decision block 44 is repeated until a target is selected that does not have stored tape stiction history deemed to be sticky. The decision to avoid a target may be based on a prescribed total weight accumulated in a given stiction zone, and weighted stiction values may be assigned as detected. Thus, a target requires sufficiently-weighted stored tape stiction history before being avoided.

Once an acceptable target is selected, the tape motion is started at block 48. At decision block 50, the tape drive 10 determines whether hard stiction is detected. As discussed above, tape stiction is detected by measuring rotation of both tape reels 12 and 14 by the tachometers 24 and 26 and comparing the measurement. Hard stiction can be defined wherein a slack measurement between the two tape reels 12, 14 exceeds a predetermined amount, which may be measured as at least four tenths of an inch. This amount of tape stiction is referred to as hard stiction because it could result in damage to the tape 16 if motion were allowed to continue. For example, damage can occur if motion continues when tape stiction releases and slack is suddenly taken up in an uncontrolled manner. If hard stiction is detected, motion of the tape is stopped and tension upon the tape is dropped to zero at block 52.

At decision block 54, motion of the tape is retried a limited number of times. If the retry count exceeds a retry limit, the motion of the tape is failed at block 56. Once motion of the tape is failed at block 56, an error message may be provided thereby requiring maintenance and/or repair of the associated tape cartridge. If the tape stiction at the retry does not exceed a limit, then at block 58 the tape stiction history for the associated cartridge is updated. For example, the location upon the tape 16 may be stored in a stiction table in program memory and subsequently avoided as a target. The location may also be weighted. For example, hard stiction may be weighted with a value of "10", so that the decision to avoid a target at block 44 may be determined based on a prescribed total weight accumulated in a given stiction zone.

At block 58, the retry count is incremented. At block 60, an attempt is made to gently move the tape away from the stiction zone. For example, the associated motor is driven at a substantially reduced speed to move the stiction location upon the tape 16 away from the read/write head 18, then tape tension is reapplied by the controller 28. If the tape cannot be gently moved away at decision block 61, then the motion is failed at block 62. Subsequently, at block 63, the requested tape motion is retried, and the tape motion process is started once again at block 48.

Once the tape motion is started at block 48, decision block 50 determines whether hard stiction is detected. If hard stiction is not detected then decision block 64 determines whether soft stiction is detected. Soft stiction is a condition wherein tape stiction is detected, but is not bad enough to create concerns regarding damage to the tape 16 or the data stored on the tape 16. However, soft stiction is monitored for subsequent avoidance because repeat start/stop motions on a location of soft stiction can generally enhance to a condition of hard stiction. Thus, a predetermined measurement of soft stiction may be at least two tenths of an inch of slack measurement between the tachometers 24, 26 during a start up motion. Accordingly, if soft stiction is detected at decision block 64, then the stiction history is updated at block 66 and the requested motion is continued at block 68. The soft stiction location may also be weighted a value of "1". During target selection, a sufficiently-weighted target with a value of less than "20" would be selected; and if available, a sufficiently-weighted target with a value of zero would be selected. For example, after two hard stiction events, each weighed "10", that stiction location is avoided. Soft stiction is tested at decision block 64 and the motion is continued at block 68.

Once the motion is continued at block 68, decision block 70 determines if the target stop location is preempted such as by a stop-motion command. If the target is preempted at decision block 70, decision block 72 determines if the new target is considered sticky. If the new target is considered sticky, the target is adjusted at block 74 and decision block 72 is repeated until a target is selected that does not have sufficiently-weighted tape stiction history deemed to be sticky. Then the motion is stopped at a nonsticky target at block 76. Referring back to decision block 70, if a target is not preempted, then the motion is stopped at the nonsticky target at block 76.

Once the motion of the tape 16 is stopped, block 42 is repeated and the tape drive 10 waits for a request for targeted tape motion. By avoiding the locations of tape stiction, these locations can be recovered over time. The flowchart of FIG. 2 is repeated during the operation of the cartridge until the cartridge is ejected from the tape drive 10. In the embodiment depicted, once the tape is reloaded into the cartridge at step 40, then the tape stiction information is rediscovered. As discussed above, the tape stiction information can be rediscovered for each cartridge or may be stored.

The stiction avoidance methods provide additional protection for the end user against potential tape damage and data loss. As the requirement for data density continues to increase, the physics of the tape/head interface, such as smoother tape and head surfaces, are more likely to encounter tape stiction. The implementation of stiction avoidance minimizes stiction in future products thereby significantly increasing potential cartridge capacity for future tape drive products.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for avoiding tape stiction with a tape drive comprising:
   providing a tape drive with a pair of motors for driving a pair of tape reels for conveying data tape between the pair of tape reels across a read/write head;
   providing a tachometer for each of the pair of tape reels for measuring rotation of each of the pair of tape reels;
   starting motion of the tape by driving the pair of motors;
   measuring rotation of both tape reels by the tachometers;
   comparing the measurement of rotation of both tape reels to determine if linear displacement of both tape reels differs enough to cause slack that is associated with the tape adhering to the read/write head; and
   storing and weighting a location of tape stiction.

2. The method of claim 1 further comprising stopping motion of the tape at a location wherein excessive tape stiction has not been detected.

3. The method of claim 1 further comprising:
   receiving a request for targeted tape motion; and
   if a targeted stop location has sufficiently-weighted stored tape stiction history, then adjusting the targeted stop location.

4. The method of claim 1 further comprising:
   receiving a request for targeted tape motion; and
   if the targeted stop location does not have sufficiently-weighted stored tape stiction history, then starting the requested tape motion without target adjustment.

5. The method of claim 1 further comprising identifying and storing a potential tape stiction location if the measurement of rotation of both tape reels differs by a predetermined amount of linear displacement.

6. The method of claim 1 further comprising:
   stopping motion of the tape if the measurement of rotation of both tape reels differs by a predetermined amount of linear displacement; and
   reducing tension on the tape once motion of the tape is stopped.

7. The method of claim 6 further comprising retrying motion of the tape after the tension is reduced.

8. The method of claim 7 further comprising stopping motion of the tape as motion of the tape is retried, if the measurement of rotation of both tape reels differs by a predetermined amount of linear displacement.

9. The method of claim 7 further comprising gently moving the tape away from the location of stiction in a direction appropriate for a current motion command.

10. The method of claim 9 further comprising reapplying tension to the tape.

11. The method of claim 10 further comprising:
    starting motion of the tape; and
    stopping motion of the tape at a location wherein tape stiction has not been detected.

12. A tape drive system comprising:
    a read/write head;
    a pair of motors for driving a pair of tape reels for conveying data tape between the pair of tape reels across the read/write head;
    a pair of tachometers, each connected to one of the pair of tape reels for measuring rotation of the tape reel; and
    a controller in communication with the pair of motors and the pair of tachometers, the controller having computer executable instructions for:
    starting motion of the tape by driving the pair of motors,
    measuring rotation of both tape reels by the tachometers,
    comparing the measurement of rotation of both tape reels to determine if linear displacement of both tape reels differs enough to cause slack that is associated with the tape adhering to the read/write head, and
    storing and weighting a location of tape stiction.

13. The tape drive system of claim 12 wherein the controller further comprises computer executable instructions for stopping motion of the tape at a location wherein excessive tape stiction has not been detected.

14. The tape drive system of claim 12 wherein the controller further comprises computer executable instructions for:
   receiving a request for targeted tape motion; and
   if a targeted stop location has sufficiently-weighted stored tape stiction history, then adjusting the targeted stop location.

15. The tape drive system of claim 12 wherein the controller further comprises computer executable instructions for:
   receiving a request for targeted tape motion; and
   if the targeted stop location does not have sufficiently-weighted stored tape stiction history, then starting the requested tape motion without target adjustment.

16. The tape drive system of claim 12 wherein the controller further comprises computer executable instructions for identifying and storing a potential tape stiction location if the measurement of rotation of both tape reels differs by a predetermined amount of linear displacement.

17. The tape drive system of claim 12 wherein the controller further comprises computer executable instructions for:
   stopping motion of the tape if the measurement of rotation of both tape reels differs by a predetermined amount of linear displacement; and
   reducing tension on the tape once motion of the tape is stopped.

18. A method for avoiding tape stiction with a tape drive comprising:
   providing a tape drive with a pair of motors for driving a pair of tape reels for conveying data tape between the pair of tape reels across a read/write head;
   providing a tachometer for each of the pair of tape reels for measuring rotation of each of the pair of tape reels;
   starting motion of the tape by driving the pair of motors;
   measuring rotation of both tape reels by the tachometers;
   comparing the measurement of rotation of both tape reels to determine if linear displacement of both tape reels differs enough to cause slack that is associated with the tape adhering to the read/write head;
   storing and weighting a location of tape stiction;
   stopping motion of the tape at a location wherein excessive tape stiction has not been detected;
   waiting for a request for targeted tape motion;
   if a targeted stop location has sufficiently-weighted stored tape stiction history, then adjusting the targeted stop location; and
   if the targeted stop location does not have sufficiently-weighted stored tape stiction history, then starting the requested tape motion without target adjustment.

19. The method of claim 18 further comprising identifying and storing a potential tape stiction location if the measurement of rotation of both tape reels differs by a first predetermined amount of linear displacement.

20. The method of claim 19 further comprising:
   stopping motion of the tape if the measurement of rotation of both tape reels differs by a second predetermined amount of linear displacement;
   reducing tension on the tape once motion of the tape is stopped;
   retrying motion of the tape after the tension is reduced;
   stopping motion of the tape as motion of the tape is retried, if the measurement of rotation of both tape reels differs by the second predetermined amount of linear displacement;
   gently moving tape away from the location of stiction in a direction appropriate for a current motion command;
   reapplying tension to the tape;
   starting motion of the tape; and
   stopping motion of the tape at a location wherein tape stiction has not been detected.

* * * * *